(12) United States Patent
Kuo

(10) Patent No.: US 7,414,820 B2
(45) Date of Patent: Aug. 19, 2008

(54) PROTECTIVE APPARATUS

(75) Inventor: Heng-Chen Kuo, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 181 days.

(21) Appl. No.: 11/298,369

(22) Filed: Dec. 9, 2005

(65) Prior Publication Data
US 2006/0126244 A1    Jun. 15, 2006

(30) Foreign Application Priority Data
Dec. 10, 2004    (CN) .................. 2004 1 0077490

(51) Int. Cl.
*H02H 3/26* (2006.01)
*H02H 3/38* (2006.01)

(52) U.S. Cl. ..................................... 361/77
(58) Field of Classification Search ............ 361/77
See application file for complete search history.

(56) References Cited

U.S. PATENT DOCUMENTS

| | | | |
|---|---|---|---|
| 3,949,336 A | 4/1976 | Dietz | |
| 4,263,589 A * | 4/1981 | Lewiner et al. | 340/638 |
| 4,631,449 A * | 12/1986 | Peters, Jr. | 315/205 |
| 5,182,547 A | 1/1993 | Griffith | |
| 5,211,037 A * | 5/1993 | Adamski et al. | 68/12.16 |
| 5,737,168 A * | 4/1998 | Baker | 361/90 |
| 5,808,469 A * | 9/1998 | Kopera | 324/434 |
| 6,675,108 B2 | 1/2004 | Fedirchuk et al. | |
| 7,123,156 B2 * | 10/2006 | Sadjadi | 340/638 |
| 2005/0286189 A1 * | 12/2005 | Rhodes | 361/62 |

* cited by examiner

*Primary Examiner*—Michael J Sherry
*Assistant Examiner*—Ann T Hoang
(74) *Attorney, Agent, or Firm*—Morris Manning Martin LLP; Tim Tingkang Xia, Esq.

(57) ABSTRACT

A protective apparatus for protecting electric device connected to an AC circuit from being damaged at a time of misconnection between a live line and a neutral line thereof. The protective apparatus includes a detector, a controller, and an alarm. The detector is connected between the neutral line and the earth line. The controller is connected between the live line and the neutral line and includes a DPDT switch. Two blades of the switch switchably connected to the electric device and the alarm. The detector includes a voltage grading circuit, a rectifier-filter, a detect circuit, and an isolating circuit. Once misconnection between the live line and the neutral line occurs, an abnormal voltage is transformed by the detector to a stable DC power output, which drives the controller to disconnect the device from the live line and the neutral line and activate the alarm.

6 Claims, 2 Drawing Sheets

PROTECTIVE APPARATUS

BACKGROUND OF THE INVENTION

1. Field of the Invention

The present invention relates to protective apparatuses, and particularly to a protective apparatus that protects device connected to an AC circuit from being damaged if there is a misconnections between a live line and an earth line.

2. General Background

Most electric equipment, such as household appliances and factory machines, are generally powered by a three-phase AC power system. The AC power system generally includes a live (hot) line, a neutral line, and an earth line. The live line and the neutral line are for providing power to the electric equipment. The earth line is grounded.

It is known that line mismatches in a circuit may happen, and equipment connected to the circuit may be damaged. Conventionally, safe fuses are connected to the live line and the neutral line. If too much power is drawn by the circuit, the safe fuse is melted to break the circuit so that the equipment connected to the circuit is protected. It is simple but costly to use safe fuses to protect the equipment, and the safe fuses may have a slow response time and lack the necessary sensitivity required for proper protection of the circuit and the attached equipment. Additionally, it is costly and troublesome to replace melted fuses with new ones.

What is desired, therefore, is a protective apparatus which sensitively and conveniently protects device connected to an AC circuit.

SUMMARY

In a preferred embodiment, a protective apparatus for protecting electric device connected to an AC circuit from being damaged at a time of misconnection between a live line and a neutral line thereof. The protective apparatus includes a detector, a controller, and an alarm. The detector is connected between the neutral line and an earth line. The controller is connected between the live line and the neutral line and includes a double-post double throw (DPDT) switch. Two blades of the switch can selectively connect to the electric device and the alarm. The detector includes a voltage grading circuit, a rectifier-filter, a detection circuit, and an isolating circuit. Once misconnection between the live line and the neutral line occurs, an abnormal voltage is processed by the detector to a stable DC power output, which can drive the controller to disconnect the equipment from the live line and the neutral line and activate the alarm.

Other advantages and novel features will become more apparent from the following detailed description when taken in conjunction with the accompanying drawings, in which:

DETAILED DESCRIPTION OF THE EMBODIMENT

Figure 1:
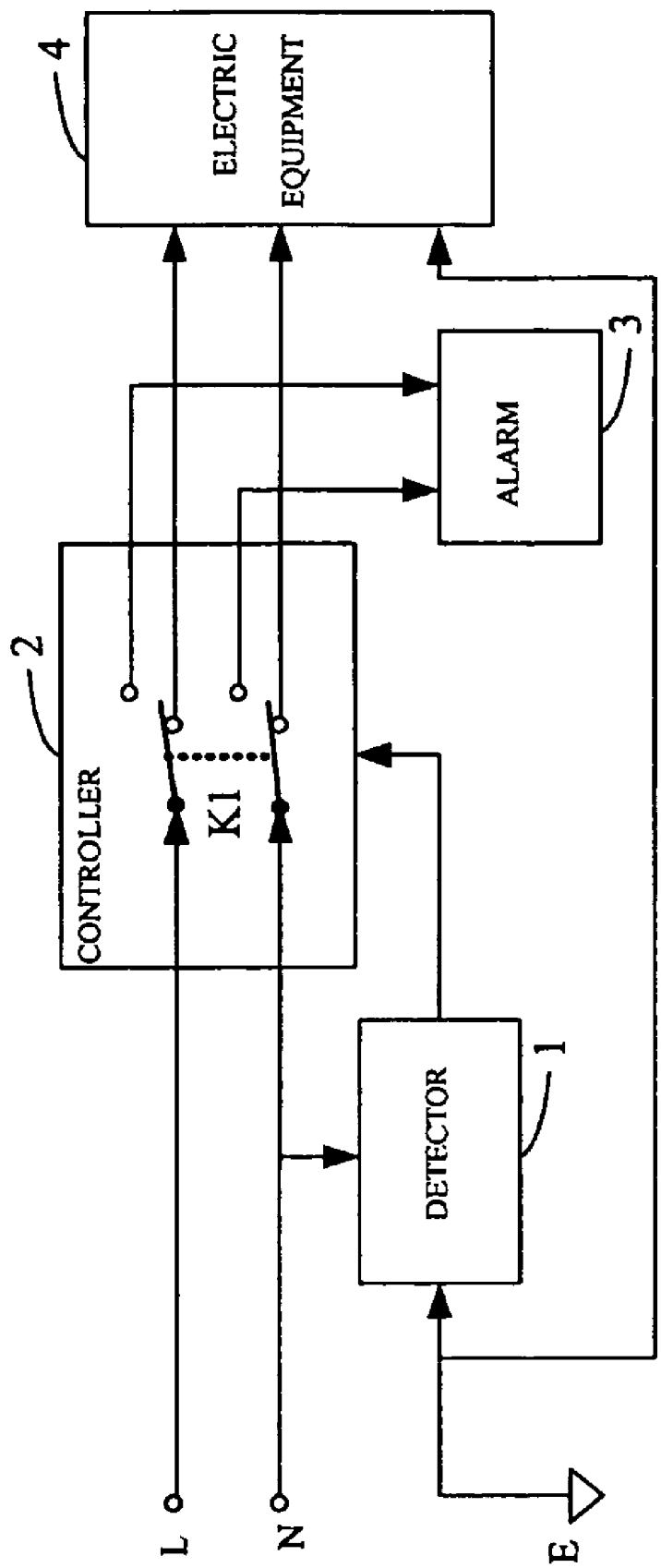
FIG. 1 is a block diagram of a protective apparatus in accordance with a preferred embodiment of the present invention.

Referring to FIG. 1, a protective apparatus in accordance with a preferred embodiment of the present invention is for protecting an electric device 4 connected to an AC circuit. The AC circuit includes a live line L, a neutral line N, and an earth line E. The protective apparatus is connected between the live line, the neutral line and the device 4. The protective apparatus includes a detector 1, a controller 2, and an alarm 3. The detector 1 is connected between the neutral line N and the earth line E. The detector 1 is also connected to the controller 2. The controller 2 is connected between the live line L and the neutral line N. The controller 2 is separately connected to the device 4 and the alarm 3. When the live line L and the neutral line N are misconnected, an abnormal voltage arises between the neutral line N and the earth line E. The abnormal voltage is generally greater than zero and can reach to 110V or 220V. Once the controller 2 detects the abnormal voltage, power is cut off before it reaches the device 4, and the alarm 3 is activated.

Figure 2:
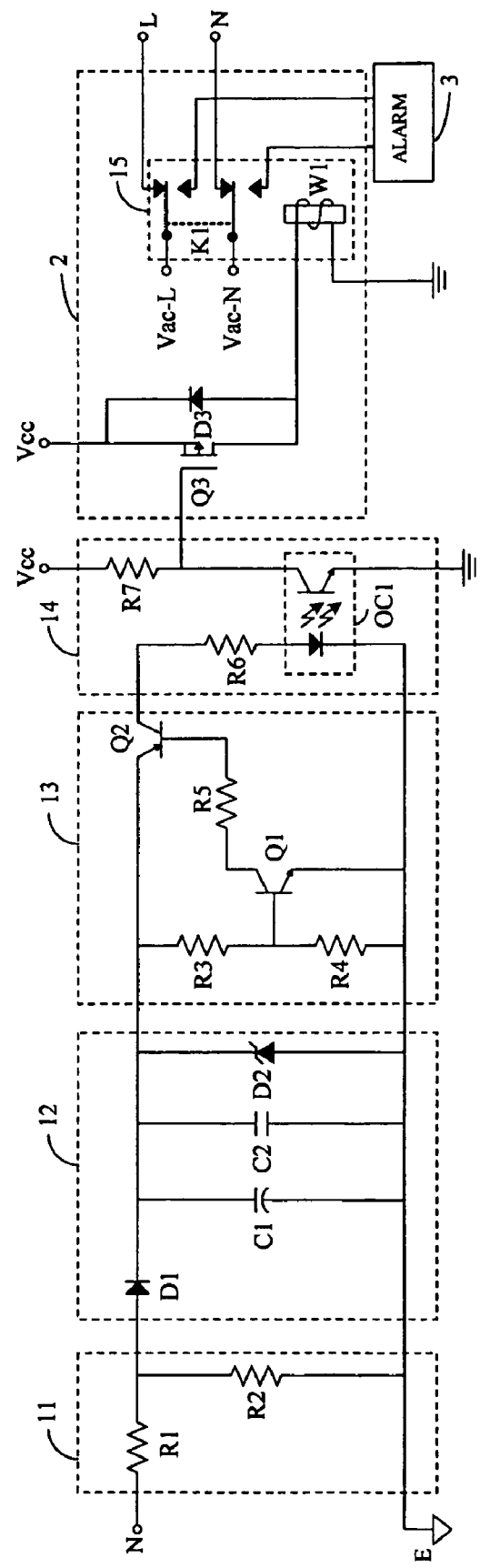
FIG. 2 is a circuit diagram of the protective apparatus of the FIG. 1.

Referring to FIG. 2, the detector 1 includes a voltage grading circuit 11, a rectifier-filter circuit 12, a detection circuit 13, and an isolating circuit 14 for isolating high voltages, connected in series. When the live line L and the neutral line N misconnect, the abnormal voltage passes through the voltage grading circuit 11 where it is decreased, then passes through the rectifier-filter circuit 12 to be converted to a DC voltage, then passes through the detection circuit 13 and the isolating circuit 14 to drive the controller 2.

The voltage grading circuit 11 includes a resistor R1 and a resistor R2 connected in series between the neutral line N and the earth line E.

The rectifier-filter 12 includes a diode D1, a capacitor C2, a Zener diode D2, and a tantalum capacitor C1. The diode D1 with low capacitance is a common nonpolar diode, which filters HF (high frequency) noise from AC signals. The tantalum capacitor C1 with a high capacitance is a polar capacitor, which filters LF (low frequency) noise from AC signals. An anode of the diode D1 is connected to a node between the resistors R1 and R2. An anode of the Zener diode D2 and a cathode of the tantalum capacitor C1 are grounded. A cathode of the Zener diode D2 and an anode of the tantalum capacitor C1 are connected to a cathode of the diode D1. The capacitor C2 is connected in parallel to the Zener diode D2 and the tantalum capacitor C1.

The detection circuit 13 includes a resistor R3, a resistor R4, a resistor R5, a transistor Q1, and a transistor Q2. The transistor Q1 is an NPN bipolar junction transistor (BJT). The transistor Q2 is a PNP bipolar junction transistor (BJT). One end of the resistor R3 is connected to the cathode of the diode D1. The resistor R4 is connected to the other end of the resistor R3 and the earth line E. A base of the transistor Q1 is connected to a node between the resistors R3 and R4. An emitter of the transistor Q1 is grounded. The resistor R5 is connected between a collector of the transistor Q1 and a base of the transistor Q2. An emitter of transistor Q2 is connected to the cathode of the diode D1.

The isolating circuit 14 includes a resistor R6, a resistor R7, a power supply Vcc, and a optical coupler OC1. One end of the resistor R6 is connected to a collector of the transistor Q2. The other end of the first resistor R6 is connected to an anode of the optical coupler OC1. A cathode of the optical coupler OC1 is grounded. The resistor R7 is connected between the power source Vcc and a collector of the optical coupler OC1. An emitter of the optical coupler OC1 is grounded.

The controller 2 includes a transistor Q3, a diode D3, and a relay 15. The transistor Q3 is a P-channel field-effect transistor. A gate of the transistor Q3 is connected to a node between the resistor R7 and the collector of the optical coupler OC1. A source of the transistor Q3 is connected to the power supply Vcc. A drain of the transistor Q3 is connected to one end of a winding W1. The winding W1 has an iron core. Another end of the winding W1 is grounded. An anode of the diode D3 is connected to the drain of the transistor Q3, a cathode of the diode D3 is connected to the source of the transistor Q3. The relay 15 includes a DPDT switch K1, and the winding W1. The switch K1 is located above the winding W1 and includes a pair of blades switchably connected to the device 4 and the alarm 3. When the switch K1 is in an original position the circuit is connected for the live line L and the neutral line N and the circuit for the alarm 3 is disconnected. When there is an occurrence of an abnormal voltage the switch K1 moves to a second position and connects the circuit to the alarm 3 and the circuit for the live line L and the neutral line N is disconnected. The diode D3 is for stabilizing a voltage between the drain and the source of the transistor Q3 and preventing the transistor Q3 from being damaged by a voltage produced by the winding W1.

The protective apparatus works as follows. There is no voltage between the neutral line N and the earth line E in a normal working state. There will be an abnormal voltage between the neutral line N and the earth line E when the neutral line N is misconnected with the live line L. The abnormal voltage is divided by the resistors R1 and R2 of the voltage grading circuit 11. The diode D1 only allows a positive semi-period of the abnormal voltage to pass. The tantalum capacitor C1 and the capacitor C2 separately filter low frequency and high frequency noises from the abnormal voltage. The Zener diode D2 stabilizes the abnormal voltage at a predetermined level. The abnormal voltage output is further divided by the resistors R3 and R4 so as to provide a turn-on voltage (about 0.7 v) to the base of the transistor Q1. The transistor Q1 is turned on. A voltage of the base of the transistor Q2 is accordingly decreased. The transistor Q2 and the optical coupler OC1 are turned on. A voltage of the gate of the transistor Q3 is decreased. The transistor Q3 is turned on and the winding W1 starts to work. The winding W1 produces a magnetic attraction to pull the blades of the switch K1 thereby disconnecting power to the device 4 and connecting power to the alarm 3.

Once misconnection between the live line and the neutral line is corrected, the abnormal voltage disappears. As there is no current provided to the winding W1, the magnetic attraction ceases, and the blades of the switch K1 return to an original position automatically disconnecting power to the alarm and reconnecting power to the device.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A protective apparatus for preventing an electrical device from being electrically damaged, the device is connected to an AC circuit via the protective apparatus, the circuit comprising a live line, a neutral line, and an earth line, the protective apparatus comprising;
    a detector connected between the neutral line and the earth line, the detector comprising a rectifier-filter circuit, a detection circuit, and an isolating circuit connected in series, the detector converting an abnormal AC voltage between the neutral line and the earth line, when a misconnection occurs, to a stable DC voltage; and
    a controller connected between the live line and the neutral line, the controller receiving and driven by the stable DC voltage of the detector, the controller allowing power to the device in a normal working state and disconnecting from the device when the misconnection occurs between the live line and the neutral line, the controller comprising a field-effect transistor having a control terminal receiving a start voltage, a power terminal, and a ground terminal, a winding with an iron core, and a switch, the ground terminal connected to ground via the winding, the switch attracted by the iron of the winding when the transistor is turned on to disconnect the live line and the neutral line;
    wherein the detector further comprises a voltage grading circuit, the voltage grading circuit comprises a first resistor and a second resistor connected in series between the neutral line and the earth line;
    wherein the rectifier-filter circuit comprises a diode, a capacitor, and a tantalum capacitor, an anode of the diode is connected to a node between the first and second resistors, a cathode of the diode is connected to a cathode of the tantalum capacitor, an anode of the tantalum capacitor is grounded, the capacitor is connected in parallel to the tantalum capacitor;
    wherein the rectifier-filter circuit further comprises a Zener diode, an anode of the Zener diode is grounded, a cathode of the Zener diode is connected to the cathode of the tantalum capacitor; and
    wherein the detection circuit comprises a third resistor, a forth resistor, a fifth resistor, a first transistor, a second transistor, one end of the third resistor is connected to the cathode of the diode, the forth resistor is connected to the other end of the third resistor and the earth line, a base of the first transistor is connected to a node between the third and forth resistors, an emitter of the first transistor is grounded, the fifth resistor is connected between a collector of the first transistor and a base of the second transistor, an emitter of the second transistor is connected to the cathode of the diode.

2. The protective apparatus as claimed in claim 1, wherein the isolating circuit comprises a sixth resistor, a seventh resistor, a power supply, and an optical coupler, one end of the sixth resistor is connected to a collector of the second transistor, the other end of the sixth resistor is connected to an anode of the optical coupler, a cathode of the optical coupler is grounded, the seventh resistor is connected between the power source and a collector of the optical coupler, an emitter of the optical coupler is grounded.

3. The protective apparatus as claimed in claim 2, wherein the field-effect transistor is a P-channel field-effect transistor, a gate of the transistor is connected to a node between the seventh resistor and the collector of the optical coupler, a source of the transistor is connected to the power supply, a drain of the transistor is connected to one end of the winding.

4. The protective apparatus as claimed in claim 3, further comprising an alarm configured in a circuit with the switch, wherein the switch is a double-pole double throw switch and located above the winding, the winding comprises a pair of blades, the blades switch away from the alarm in a normal state, the blades are connected to the alarm in an abnormal state when the misconnection occurs.

5. The protective apparatus as claimed in claim 3, wherein the controller further comprises a second diode, an anode of the second diode is connected to the drain of the field-effect transistor, a cathode of the second diode is connected to the source of the field-effect transistor.

6. The protective apparatus as claimed in claim 1, further comprising an alarm connected to the controller, wherein the alarm is connected with the switch to form a circuit for giving out a warning when the misconnection occurs.

* * * * *